United States Patent
Schornstein

(10) Patent No.: US 10,865,283 B2
(45) Date of Patent: Dec. 15, 2020

(54) METHOD FOR PRODUCING COMPOSITE FIBER COMPONENTS

(71) Applicant: Covestro Deutschland AG, Leverkusen (DE)

(72) Inventor: Marcel Schornstein, Neuss (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 149 days.

(21) Appl. No.: 16/076,915

(22) PCT Filed: Mar. 1, 2017

(86) PCT No.: PCT/EP2017/054807
§ 371 (c)(1),
(2) Date: Aug. 9, 2018

(87) PCT Pub. No.: WO2017/149031
PCT Pub. Date: Sep. 8, 2017

(65) Prior Publication Data
US 2019/0048160 A1 Feb. 14, 2019

(30) Foreign Application Priority Data

Mar. 4, 2016 (EP) .................................. 16158613

(51) Int. Cl.
| | |
|---|---|
| *C08J 5/24* | (2006.01) |
| *C08G 18/48* | (2006.01) |
| *C08J 5/04* | (2006.01) |
| *B29C 70/34* | (2006.01) |
| *B29C 70/54* | (2006.01) |
| *C08J 5/10* | (2006.01) |
| *C08G 18/76* | (2006.01) |
| *B29K 75/00* | (2006.01) |

(52) U.S. Cl.
CPC ............... *C08J 5/24* (2013.01); *B29C 70/345* (2013.01); *B29C 70/545* (2013.01); *C08G 18/4825* (2013.01); *C08G 18/4833* (2013.01); *C08G 18/7664* (2013.01); *C08J 5/04* (2013.01); *C08J 5/10* (2013.01); *B29K 2075/00* (2013.01); *C08J 2375/04* (2013.01)

(58) Field of Classification Search
CPC ......... C08J 5/24; C08J 5/04; C08J 5/10; C08J 2375/04; C08G 18/4825; C08G 18/4833; C08G 18/7664; B29C 70/345; B29C 70/545; B29K 2075/00
USPC ........................................................ 156/242
See application file for complete search history.

(56) References Cited

U.S. PATENT DOCUMENTS

2017/0051120 A1* 2/2017 Schornstein ....... C08G 18/4812

FOREIGN PATENT DOCUMENTS

| WO | 20140170252 A1 | 10/2014 | |
|---|---|---|---|
| WO | 20150165823 A1 | 11/2015 | |
| WO | WO-2015165823 A1 * | 11/2015 | ......... C08G 18/6677 |
| WO | 20160001100 A1 | 1/2016 | |

OTHER PUBLICATIONS

International Search Report for PCT/EP2017/054807, dated May 12, 2017. (English translation attached).
Written Opinion of the International Searching Authority for PCT/EP2017/054807, dated May 12, 2017.

* cited by examiner

*Primary Examiner* — Philip C Tucker
*Assistant Examiner* — Vicki Wu
(74) *Attorney, Agent, or Firm* — K&L Gates LLP

(57) ABSTRACT

The present disclosure relates to sheet moulding compounds (SMC) and to a method for producing composite fiber components from said SMC, based on a polyurethane reaction mixture consisting of (A) at least one aromatic isocyanate component, (B) 70 to 100 wt % of at least one polyol component having at least 70% secondary OH groups, a number average OH count of 15-500 mg KOH/g and functionality of 1.9-2.5, (C) 0-30 wt % of at least one polyol having a number average OH count of 15-500 mg KOH/g and a functionality of 1.9-2.5, (D) as applicable, short-chain polyol, (E) internal separating agent, (F) a thermolatent catalyst, and (G) as applicable, auxiliary and/or additional substances, wherein the PUR reaction mixture has an initial viscosity of 2,500-14,000 mPas at 23° C. and the ratio of NCO groups/OH groups is 1.35:1-10:1.

5 Claims, No Drawings

METHOD FOR PRODUCING COMPOSITE FIBER COMPONENTS

CROSS-REFERENCE TO RELATED APPLICATIONS

This application is a U.S. national stage application, filed under 35 U.S.C. § 371, of International Application No. PCT/EP2017/054807, which was filed on Mar. 1, 2017, and which claims priority to European Patent Application No. 16158613.6, which was filed on Mar. 4, 2016. The contents of each are incorporated by reference into this specification.

FIELD

The invention relates to sheet molding compounds (SMC) and to a process for producing fiber composite component parts from these sheet molding compounds (SMC).

BACKGROUND

Fiber composite materials are in principle constructed from a matrix material composed of plastic and natural or synthetic, organic or inorganic fibers incorporated therein. Fiber composite component parts on account of their low specific weight and their great stiffness and resilience find broad application in the aerospace industry, in vehicle, machine and plant construction and in sports equipment.

There are a multiplicity of different molding processes in existence in the field of fiber composite component parts, for example the resin transfer molding (RTM) process or the vacuum infusion process in which fiber non-crimp fabrics are placed in a mold, the mold is closed and the resin is subsequently injected into the mold. The crosslinking of the resin in the mold is typically effected by supplying heat. One difficulty and thus a disadvantage with this process is the use of fillers which increase the viscosity of the raw material mixture, thus preventing the fibers from becoming fully impregnated. In addition the filler is no longer uniformly distributed in the component part. The component part is inhomogeneous which has a negative effect on the properties of the component part.

Fiber-reinforced materials in the form of sheet molding compounds (SMC) are employed in many industrial applications on account of their convenient handling, enhanced efficiency during processing to afford component parts and good surface quality of the fiber composite component parts and are described for example in WO 99/50341 A1. WO 99/50341 A1 describes the production of fiber-reinforced component parts, wherein said parts are produced from a plurality of SMC layers. WO 03/080319 A1 describes a process for producing resin mats comprising flowable non-crimp fabric or textile reinforcement (SMC) and component parts obtained therefrom.

SMC stands for "sheet moulding compound" and is the English description for a resin mat according to DIN EN 14598-1 (reinforced curable molding compound specification for resin mats (SMC) and fiber-reinforced compression molding compounds (BMC)-Part 1: Description; German version of EN 14598:2005. SMC is generally to be understood as meaning a flowable resin mat comprising reinforcing fibers having preferably isotropic properties. SMC is a sheetlike resin mat based for example on unsaturated polyester resin or vinyl ester resin. Reinforcing fibers used are typically glass fibers but other materials are also suitable for reinforcement. A typical SMC formulation comprises for example about 30% of a polymer, about 30% of a filler and about 30% of glass fibers. The remainder is composed of additives, for example color pigments, curing agents, dispersing agents and similar substances. SMC is produced from a so-called resin stock paste (reaction mixture) and reinforcing fibers. The resin stock paste and the fibers are consecutively applied onto two carrier films. Once the reinforcing fibers have been applied both carrier films are pressed together to form a sandwich-like structure. This sandwich is processed into so-called SMC by pressing and rolling motions thus uniformly wetting the fibers with the resin. Finally the sandwich is wound onto rolls or cut and stacked. The partial curing/maturation of the reaction mixture is effected by chemical and/or physical means during the entire procedure. After this curing/maturation process the matured but not yet completely cured SMC may be subjected to further processing. After removal of the carrier films the SMC is typically processed into fiber composite component parts in heated press molds. The temperature of the mold is generally about 130° C. to 155° C. The mold temperature initiates curing and the SMC undergoes an exothermic crosslinking reaction. During the processing in the press molds the metering of the SMC is typically undertaken by manual means. To achieve problem-free manufacture of the molding (component part) adherence to precise metered amounts is important. To this end the SMC is not only cut to size using templates but is also weighed. Weighing of the cut-to-size material serves as a check and allows for any necessary correction to the cut-to-size material. The SMC is then placed in the mold and the mold is closed. Pressure is applied and maintained until the molding is completely cured.

Industrial use of SMC demands not only good handling, short maturation times and lengthy storage stabilities at room temperature but also rapid cycle times and low emissions (low VOC; for example caused by volatile solvents which may be present in the SMC).

In addition to polyesters, vinyl esters and epoxy systems there are only a few resins used with preference for production of composite component parts on account of their strength and also their high toughness. These also include inter alia polyurethane resins which on account of their toughness and their strength are also employed in particular for production of fiber composite profiles, for example in the pultrusion process. Fiber composite component parts based on polyurethane exhibit improved toughness compared to component parts made of vinyl esters, unsaturated polyester resins (UPE) or UPE-urethane hybrid resins. PUR is already employed for the production of fiber composite component parts but not in the "SMC process" because PUR is not handleable for the SMC process on account of the high reactivity of the reaction mixtures.

The matrix component of an SMC must meet a number of requirements. For example the resin stock paste must be capable of fully embedding the reinforcing fibers and of facilitating further processing of the SMC obtained therefrom into component parts/moldings at the lowest possible temperatures and low pressures. After the maturation process the SMC should exhibit as little stickiness as possible, if any, but should not be completely cured either. The resin matrix should thus be merely pre-polymerized (partially polymerized) so that it remains meltable but is no longer sticky on contact. After the curing in the mold, the thus produced component part should be removable from the mold without adhesions. The crosslinked resin matrix should have a high interfacial adhesion to the reinforcing fibers but not at the mold. A fiber composite component part should exhibit good mechanical properties, chemical stability and heat resistance.

SMC based on unsaturated polyesters and vinyl esters are known from U.S. Pat. No. 5,236,976 A and WO 03/080319 A1. The disadvantage of the resins used in these documents is that the resin contains styrene and that during production, processing and in the finished fiber composite component part styrene emissions occur which have a negative effect both on the working environment and on component part quality. In addition the mechanical properties of the produced fiber composite component parts, in particular the tensile strength, are insufficient for many applications.

SUMMARY

It is accordingly an object of the present invention to provide a process for producing fiber composite component parts having low VOC values and good mechanical properties, for example high thermal stability, high tensile strength and good surfaces, wherein the process should be simple and ideally continuous and cost-effective.

It has now been found that, surprisingly, the production of such fiber composite component parts is possible in the SMC process on the basis of special polyurethanes, wherein reinforcing fibers are encapsulated with a specific low-viscosity polyurethane reactive mixture having an elevated index (ratio of NCO groups to OH groups) and then partially cured to afford storage-stable SMC. These SMC, which are still reactive, are then molded and completely cured in a mold to afford a component part, optionally after intermediate storage. The component parts produced according to the invention and the corresponding SMC exhibit low, if any, VOC values.

In the present patent application SMC is to be understood as meaning a partially cured fiber-reinforced polyurethane (PUR) layer with or without carrier films depending on the status of the process.

The invention accordingly provides a process for producing a polyurethane-based fiber composite component part comprising the following process steps:
a) producing a polyurethane reaction mixture
b) applying the reaction mixture atop at least one of two carrier films
c) bestowing the reaction mixture on the at least one of the two carrier films with reinforcing fibers
d) bringing together the two carrier films from c) so that the carrier films on both sides surround the reaction mixture comprising the reinforcing fibers and a sandwich is formed,
e) rolling the sandwich via rolls and/or rollers,
   optionally subsequent rolling up to afford the so-called sheet molding compound (SMC) or optionally subsequent cutting of the sandwich into so-called SMC pieces and stacking of these SMC pieces
f) optionally storing the rolled-up SMC or the SMC stack
g) converting the product from step e) or f) and removing the two carrier films
h) optionally stacking a plurality of products from step g)
i) molding and completely curing the product from step g) or h) in a mold to afford the fiber composite component part,
wherein the employed polyurethane reaction mixture consists of the following components
A) one or more aromatic isocyanate components,
B1) 70% to 100% by weight of one or more polyether polyols having 70% to 100% secondary OH groups based on all of the OH groups in the molecule and having a number average OH number of 15 to 500 mg KOH/g (according to DIN EN ISO 53240, Part 2, November 2007 version) and a number-average functionality of 1.9 to 2.5
B2) 0% to 30% by weight of one or more polyols selected from the group consisting of polyether polyols, polyester polyols and polycarbonate polyols having a number average OH number of 15 to 500 mg KOH/g (according to DIN EN ISO 53240, Part 2, November 2007 version) and a number-average functionality of 1.9 to 2.5 excluding the polyol component B1),
wherein B1) and B2) sum to 100% by weight and at least 70% of the entirety of the OH groups of components B1) and B2) are secondary OH groups,
C) optionally one or more short-chain polyols having a number average OH number of 550 to 2000 mg KOH/g (according to DIN EN ISO 53240, Part 2, November 2007 version) and a number average functionality of 1.9 to 6,
D) one or more internal release agents,
E) one or more thermolatent catalysts catalytically active at temperatures of 50° C. to 120° C., preferably of 60° C. to 100° C.,
F) 20% to 70% by weight based on the polyurethane reaction mixture of inorganic fillers,
G) optionally auxiliary and/or additive substances,
wherein the ratio of the number of NCO groups of component A) to the number of OH groups of components B1), B2) and C) is from 1.35:1 to 10:1, preferably from 1.4:1 to 6.0:1.

The invention further provides a sheet molding compound (SMC) consisting of two outer carrier films and a fiber-reinforced core composed of incompletely cured polyurethane, wherein the core contains 5% to 40% by weight of reinforcing fibers and 60% to 95% by weight of incompletely cured polyurethane, wherein the polyurethane consists of a mixture of the following components
A) one or more aromatic isocyanate components,
B1) 70% to 100% by weight of one or more polyether polyols having 70% to 100% secondary OH groups based on all of the OH groups in the molecule and having a number average OH number of 15 to 500 mg KOH/g (according to DIN EN ISO 53240, Part 2, November 2007 version) and a number-average functionality of 1.9 to 2.5,
B2) 0% to 30% by weight of one or more polyols selected from the group consisting of polyether polyols, polyester polyols and polycarbonate polyols having a number average OH number of 15 to 500 mg KOH/g (according to DIN EN ISO 53240, Part 2, November 2007 version) and a number-average functionality of 1.9 to 2.5 excluding the polyol component B1),
wherein B1) and B2) sum to 100% by weight and at least 70% of the entirety of the OH groups of components B1) and B2) are secondary OH groups,
C) optionally one or more short-chain polyols having a number average OH number of 550 to 2000 mg KOH/g (according to DIN EN ISO 53240, Part 2, November 2007 version) and a number average functionality of 1.9 to 6,
D) one or more internal release agents,
E) one or more thermolatent catalysts catalytically active at temperatures of 50° C. to 120° C., preferably of 60° C. to 100° C., F) 20% to 70% by weight based on the polyurethane reaction mixture of inorganic fillers, G) optionally auxiliary and/or additive substances, wherein the ratio of the number of NCO groups of component A) to the number of OH groups of components B1), B2) and C) is from 1.35:1 to 10:1, preferably from 1.4:1 to 6.0:1.

DETAILED DESCRIPTION

The reaction mixture may be produced for example in curtain coating machines with static mixers or with dynamic mixers.

To produce the SMC initially a homogeneous polyurethane reaction mixture is produced from the components A) to G) preferably at temperatures of 10° C. to 80° C., particularly preferably of 18° C. to 60° C., and this is subsequently applied atop at least one of two carrier films optionally after cooling. The reaction mixture is then bestowed with reinforcing fibers. The thus-bestowed carrier films are placed together and then rolled as usual, preferably at 15° C. to 35° C. This achieves impregnation of the reinforcing fibers with the polyurethane reaction mixture and, simultaneously, good distribution of the fibers. After this procedure the thus produced SMC may be stored on a roll or layerwise as required and, after converting and removal of the carrier films, at a later juncture be molded and completely cured in a mold at temperatures of 90° C. to 150° C. to afford the fiber composite component parts according to the invention.

The NCO value of the incompletely cured SMC indicates the weight fraction of unconverted isocyanate groups in the polyurethane. The NCO value is determined over a period of several weeks. This NCO value is a good indicator of the storage stability of the SMC.

The NCO value of the SMC is determined weekly over a period of 4 weeks. The NCO content of the SMC according to the invention is preferably in a range from 5% by weight to 16% by weight, particularly preferably from 6% by weight to 14% by weight and particularly preferably from 8% by weight to 12% by weight. The NCO value of the SMC preferably changes only a little over a period of 4 weeks even without addition of external blocking agents/so-called stoppers. The NCO value is determined according to DIN EN ISO Plastics—Polyurethane materials—Determination of isocyanate proportion (ISO 14896:2009); German version of EN ISO 14896:2009.

The reaction mixtures employed according to the invention and the SMC produced therewith contain neither solvents nor volatile constituents and the VOC values (volatile organic components) are therefore low.

The polyurethane reaction mixtures employed according to the invention allow rapid curing (e.g. within 120 seconds) of the corresponding SMC at low temperatures (90° C. to 150° C.) and thus rapid fabrication of the fiber composite component parts.

The SMC produced according to the invention exhibit a high storage stability of several weeks at room temperature and are simple to process further.

After removal of the carrier films the SMC may in the form of a layer and in the form of a plurality of superposed layers be further processed into a fiber composite component according to the invention. Prior to complete crosslinking of the polyurethane matrix material the SMC are preferably cut to size before removal of the carrier films in order then to be pressed in a suitable mold under pressure, optionally with application of a vacuum. This ensures the SMC are uniformly distributed in the mold. Production of the fiber composite component parts from the SMC is by preference effected at temperatures of 90° C. to 150° C., preferably of 110° C. to 140° C., particularly preferably of 110° C. to 135° C., and under a pressure of 1 to 150 bar, preferably of 1 to 110 bar and particularly preferably of 1 to 100 bar, by preference over 1 to 6 minutes, preferably 1 to 4 minutes.

During the processing of the SMC into the fiber composite component parts in the mold, melting of the partially cured polyurethane matrix material achieves additional impregnation of the reinforcing fibers and good distribution in the mold before the complete curing (crosslinking) of the polyurethane reaction mixture hardens the entirety of the polyurethane matrix. The cavity of the mold may additionally be provided with an external release agent before the SMC freed of the carrier films are inserted. Further protective or decorative layers may be inserted into the mold before introduction of the SMC freed of the carrier films, for example one or more gelcoat layers.

The fiber composite component parts produced according to the invention may be employed in various applications in the construction, electricals, automotive (e.g. vehicle body parts), aerospace (aircraft construction), roadbuilding (manhole covers) and energy (wind power plants; e.g. rotor blades) industry sectors, in shipbuilding and in highly stressed structures.

Particular preference is given to a fiber composite component part whose polyurethane is obtainable from 20-50% by weight, preferably 22-45% by weight, of isocyanates (A), 10-40% by weight, preferably 12-30% by weight, of polyols (B1 and B2), 0.1-5% by weight, preferably 0.1-4% by weight, of internal release agents (D), 0.1-3% by weight, preferably 0.3-1.4% by weight, of catalyst (E), 20-70% by weight, preferably 20-65% by weight, of filler (F) and 0-3% by weight, preferably 0-1.5% by weight, of auxiliary and/or additive substances (G), wherein the weight fractions of the components A) to G) sum to 100% by weight.

The fiber proportion in the fiber composite component part is preferably 5% to 40% by weight, particularly preferably 15% to 40% by weight, very particularly preferably 25% to 35% by weight, based on the total weight of the fiber composite component part.

At 23° C. the PUR reaction mixture has a starting viscosity of 2500 to 14000 mPas (measured according to DIN EN ISO 53019, Viscometry—Measurement of viscosities and flow curves with rotational viscometers—Part 1: Fundamentals and measurement geometry, September 2008 version, shear rate d/dt=1 1/s), preferably 5000 to 11000 mPas, particularly preferably 5500 to 9000 mPas.

Employed as aromatic isocyanate component A) are the customary aromatic di- and/or polyisocyanates. Examples of such suitable polyisocyanates are 1,4-phenylene diisocyanate, 2,4- and/or 2,6-tolylene diisocyanate (TDI), 1,5-naphthylene diisocyanate, 2,2'- and/or 2,4'- and/or 4,4'-diphenylmethane diisocyanate (MDI) and/or their higher homologues (pMDI), 1,3- and/or 1,4-bis(2-isocyanato-prop-2-yl)benzene (TMXDI), 1,3-bis(isocyanatomethyl)benzene (XDI). Isocyanates used are preferably diphenylmethane diisocyanate (MDI) and in particular mixtures of diphenylmethane diisocyanate and polyphenylenepolymethylene polyisocyanate (pMDI). In addition to the abovementioned isocyanates it is also possible to use modified isocyanates, for example isocyanate prepolymers produced with alcohols, in particular with polyether polyols or polyester polyols, and for example those having a uretdione, isocyanurate, carbodiimide, uretonimine, allophanate or biuret structure. The modified isocyanate component by preference has a monomer content between 35% and 55% by weight, preferably between 40% and 50% by weight, particularly preferably between 43% and 49% by weight. The NCO content of the prepolymers used as isocyanate component A) is by preference 27% to 31% by weight, preferably 28-31% by weight. The content of ester groups in the preferably employed prepolymers based on polyester polyols is preferably between 5% to 7.5% by weight. The NCO content is determined according to DIN EN ISO Plastics—Polyurethane materials—Determination of isocyanate proportion (ISO 14896:2009); German version of EN ISO 14896:2009. The viscosity of the prepolymer measured according to DIN EN ISO 53019 (Viscometry—Measurement of viscosities and flow curves with rotational viscometers—Part 1: Fundamentals and measurement geometry, September 2008 version, shear rate d/dt=100 l/s) is preferably 30 to 250 mPas (at 20° C.), particularly preferably 30 to 200 mPas (at 20° C.) and very particularly preferably 30 to 170 mPas (at 20° C.).

In the case of a single employed polyol the OH number of the polyol component B1) indicates the OH number of said polyol. In the case of mixtures the number-average OH number of the mixture is indicated. This value is determined according to DIN EN ISO 53240 Determination of hydroxyl number—Part 2: Method with catalyst, November 2007 version.

The polyol component (polyol or polyol mixture) B1) has an OH number (OHN), optionally an average OHN, of 15 to 500 mg KOH/g, preferably of 50 to 400 mg KOH/g and particularly preferably of 60 to 300 mg KOH/g. The employed polyol component preferably has a number-average functionality of 1.9 to 2.5. In the context of the present application functionality is to be understood as meaning the number of NCO-reactive groups per molecule.

The polyol component B1) contains at least one polyol whose proportion of terminal secondary OH groups is 70% to 100%, preferably 80-100%, based on the entirety of the OH groups in the molecule. According to the invention polyether polyols are employed.

Preferably employed as polyol component B2) are polyether polyols, polyester polyols, polyether ester polyols or polycarbonate polyols having average OHN values of 15 to 500 mg KOH/g, preferably of 50 to 400 mg KOH/g and particularly preferably of 60 to 300 mg KOH/g and number-average functionalities of 1.9 to 2.5, wherein the component B2) is not identical to the component B1).

Employable as component C) are in particular alcohols (e.g. ethylene glycol, glycerol) and/or polyether polyols having a number-average functionality of 1.9-6. In the case of a single employed compound the OH number of the component C) indicates the OH number of said compound. In the case of mixtures the number-average OH number of the mixture is indicated. The OHN is determined according to DIN EN ISO 53240 Determination of hydroxyl number—Part 2: Method with catalyst, November 2007 version.

The component C) has an OH number (OHN), optionally number-average OHN, of 550 to 2000 mg KOH/g, preferably of 550 to 1950 mg KOH/g and particularly preferably of 550 to 1850 mg KOH/g. The employed component C) preferably has a number-average functionality of 1.9 to 6. Particularly preferably employed as component C) are compounds which have molecular weights of 60 to 499 and 3 or more active H atoms and function as crosslinking agents, for example glycerol, trimethylolpropane, pentaerythritol and alkoxylation products thereof.

Employed as internal release agents D) are for example fatty acid esters, products consisting of salts of aliphatic carboxylic acids reacted with amines containing preferably primary amine or amide or ester groups, or metal salts of a carboxylic acid, an amidocarboxylic acid, a phosphoric acid or a boric acid in combination with certain tertiary amines Such internal release agents are known from WO 99/16602 A for example.

Preferably employed as thermolatent catalysts E) are catalysts that are catalytically active in the range between 50° C. and 120° C. Typical thermolatent catalysts are for example blocked amine and amidine catalysts from the manufacturers Air Products (for example Polycat® SA-1/10 (phenol-blocked 1,8-diazabicyclo[5.4.0]undec-7-ene (=DBU)), Polycat® SA 102/10, Dabco KTM 60, DABCO® 8154 (formic acid-blocked triethylenediamine) or DABCO® WT) and Tosoh Corporation (for example Toyocat® DB 2, DB 30, DB 31, DB 40, DB 41, DB 42, DB 60, DB 70) and Huntsman Corporation (for example Accelerator DY 9577). However, it is possible to use other thermolatent catalysts known from polyurethane chemistry having a so-called switching temperature of 50° C. to 120° C. Employable as thermolatent catalysts E) are the known catalysts, usually bases (tertiary amines, salts of weak acids such as potassium acetate) and organic metal compounds. Such known thermolatent gases are for example known from WO 2009/132784 A. Further representatives of thermolatent catalysts and details concerning the mode of action of these catalysts are described in Kunststoff-Handbuch, volume VII "Polyurethanes", 3rd edition, Carl Hanser Verlag, Munich/Vienna, 1993 on pages 104-110.

Contemplated as fillers F) are for example natural ground minerals, metal oxides, silicates, sulfates, carbonates, silica, diatomaceous earth, quartz flour or mixtures of two or more of these fillers. Preferred metal oxides are titanium dioxide, zinc oxide, aluminum oxide and magnesium oxide. Preferred sulfates are barium sulfate and calcium sulfate. Preferred silicates are talc, kaolin, mica and wollastonite. Preferred carbonates are carbonates of alkaline earth metals.

Auxiliary and/or additive substances (additives) G) may optionally be added. These are for example deaerators, defoamers, flow assistants, organic or inorganic dyes, blowing agents. Further known additives and additive agents which may be used as necessary are described in Polyurethane Handbook, 2nd Edition, Gunter Oertel, Carl Hanser Verlag, Munich/Vienna/New York, 1994 on pages 98-119.

Employable as reinforcing fibers are sized or unsized fibers, for example glass fibers, carbon fibers, metal fibres (e.g. steel or iron fibers), natural fibers, aramid fibers, polyethylene fibers, basalt fibers. The fibers may be used in the form of wovens, non-crimp fabrics, braids, mats, nonwovens, knits and/or chopped fibres having a length of 0.1 to 50 mm; chopped fiber-reinforced composite component parts are preferred. When using SMC having a defined fiber orientation it is possible by appropriate layering of a plurality of SMC to obtain different orientations of the fibers in the component part, for example unidirectional and/or multidirectional.

The invention shall be more particularly elucidated with reference to the examples which follow.

EXAMPLES

Instruments and Standards Used:
Determination of hydroxyl number according to DIN EN ISO 53240—Part 2: Method with catalyst, November 2007 version
Determination of NCO content (Plastics—Polyurethane raw materials)—according to DIN EN ISO 14896 of 2009

Tensile test according to DIN EN ISO 527: Plastics—Determination of tensile properties—Part 1: General fundamentals (ISO 527-1 von 2012)

Methods for determining density of non-foamed plastics according to DIN EN ISO 1183-1 of 2012—Part 1: Immersion method, method with liquid pycnometer and titration method HDT determination according to ISO 75-1/75 of 2004; Method A (flat ended)

Determination of textile glass and mineral filler content according to DIN EN ISO 1172 of 1996; Textile glass-reinforced plastics—Prepregs, molding materials and laminates, calcination method Viscosity determination according to DIN 53019-1 of 2008-09 (H<<R), d/dt=shear rate, plate—plate measuring system PP 25, measurement in rotation at 23° C. An Anton Paar "MCR 501" rheometer was used for the measurement.

Determination of the VOC value according to industrial regulation VDA 278—Thermodesorption analysis of organic emissions for characterization of nonmetallic motor vehicle materials, issued 10.01.2011. The SMC were not subjected to open storage for 7 days at a maximum of 23° C. as described in VDA 278 but rather were analyzed immediately after production.

Determination of gel time ($t_g$): The gel time of the PUR reaction mixture was determined using a Paul N. Gardner "Gardco" GT-SHP-220 gel timer. The instrument consists of a stirrer immersed in the reaction mixture and driven by an electric motor. As soon as the specific maximum torque for this device is reached (the PUR reaction mixture is now in a high-viscosity or solid state) the motor stops and the gel time can be read on the device.

General Production Procedure

SMC were produced from polyisocyanates, polyols, fillers, additives, latent catalysts and reinforcing fibers and subsequently molded and cured to afford a fiber composite component part according to the invention. To produce the SMC a thin layer of a polyurethane reaction mixture was applied atop each of 2 carrier films. Reinforcing fibers were then broadcast onto one of the layers of polyurethane reaction mixture. Both carrier films were brought together with the polyurethane layers so that the PUR layers ended up as a core ply between the carrier films. The thus obtained sandwich was rolled and the PUR reaction mixture underwent partial curing. The SMC was converted into 10×20 cm pieces and the carrier films removed. 4 of these converted SMC pieces were then placed on top of one another and subsequently compressed in a press mold at 130° C. and 5 bar over 120 seconds to afford a fiber composite component part having a wall thickness of 4 mm.

The NCO/OH ratio indicates the ratio of the number of NCO groups in the polyisocyanate component A) to the number of OH groups in the component B).

Details (such as amounts and properties) are reported in the table.

The gel time ($t_g$) of the homogeneously mixed PUR reaction mixture was determined by means of the gel timer using 75 g of material.

The produced fiber composite component parts were used to produce test specimens for the tensile test according to DIN EN ISO 527: Plastics—Determination of tensile properties—Part 1: General fundamentals (ISO 527-1:2012). Also determined were heat distortion temperature (HDT) according to DIN EN ISO 75-1/75 2004, Method A (flat ended), and density according to methods for determining density of non-foamed plastics—Part 1: Immersion method, method with liquid pycnometer and titration method (ISO 1183-1:2012). The sum of the glassfiber and filler content of the molded articles was determined by ashing of the test specimens according to DIN EN ISO 1172: Textile glass-reinforced plastics—Prepregs, molding materials and laminates, determination of textile glass and mineral fillers content, calcination method (ISO 1172: 1996).

The viscosity of the PUR reaction mixture was determined directly after mixing and 15 minutes after mixing the components with a rotary viscometer at 23° C. at a shear rate of 1 l/s according to DIN EN ISO 53019, Viscometry—Measurement of viscosities and flow curves with rotational viscometers—Part 1: Fundamentals and measurement geometry, September 2008 version, shear rate d/dt=1 l/s.

To determine the VOC value test specimens (30×3×3 mm) of the SMC were immediately after production analyzed according to industrial regulation VDA 278—Thermodesorption analysis of organic emissions for characterization of nonmetallic motor vehicle materials.

Example 1

33 g of a polyether polyol having an OH number of 112 mg KOH/g, having 95% based on all OH groups of secondary OH groups and having a number-average functionality of 2 (viscosity at 25° C.: 140 mPas; 1,2-propylene glycol starter; based on propylene oxide, trade name DESMOPHEN® PE 9015—product of Covestro Deutschland AG), 0.3 g of Edenor® TI 05 (additive: dist. oleic acid; product of Cognis GmbH) and 1.0 g of Toyocat® DB40 (thermolatent catalyst: blocked amine from TOSOH Corporation) were homogeneously mixed. Subsequently, 29.9 g of the filler Millicarb® OG (calcium carbonate: product of Omya) were added and the mixture was mixed. Simultaneously, to 55.4 g of Desmodur® 44P01 (polyisocyanate from Covestro Deutschland AG; f=2.68; NCO content: 29.15% by weight; viscosity at 20° C.: 135 mPas) 89.7 g of the filler Millicarb® OG (calcium carbonate: product of Omya) were added and the mixture was mixed. The two mixtures were combined. The thus produced reaction mixture had a filler content of 57.1% by weight and was applied atop 2 carrier films made of polyethylene. Reinforcing fibers (27 mm chopped glass made of Vetrotex® EC 2400/P207) were broadcast onto one of the coated films. Both carrier films were placed together to form a sandwich comprising an inner layer of PUR reaction mixture between two carrier films. The sandwich was rolled to achieve a good distribution of the fibers. The inner polyurethane layer had a reinforcing fiber content of 30% by weight and an NCO value after 7 days of 10.5% by weight. The SMC was converted into 10×20 cm pieces, the carrier films removed and 4 of these converted SMC pieces were placed on top of one another and subsequently compressed in a mold at 130° C. and 5 bar to afford a fiber composite component part.

To determine the gel time of the reaction mixture and the viscosity time profile at 23° C. the reaction mixture was stirred for 10 seconds in a paper cup without previous degassing of the starting components until the mixture was in a homogeneous state. To determine gel time and viscosity the mixture was transferred into the gel timer and the rheometer respectively.

Comparative Example 2

33 g of a polyether polyol having an OH number of 190 mg KOH/g, having 95% primary OH groups based on the entirety of the OH groups and having a number-average functionality of 2 (viscosity at 25° C.: 120 mPas; 1,2- propylene glycol starter; based on ethylene oxide, trade name DESMOPHEN® L 300—product of Covestro Deutschland AG), 0.3 g of Edenor® TI 05 (additive: dist. oleic acid; product of Cognis GmbH) and 1.0 g of Toyocat® DB40 (thermolatent catalyst: blocked amine from TOSOH Corporation) were homogeneously mixed. Subsequently, 34.3 g of the filler Millicarb OG (calcium carbonate: product of Omya) were added. Simultaneously, to 68.7 g of Desmodur® 44P01 (polyisocyanate from Covestro Deutschland AG; f=2.68; NCO content: 29.15% by weight; viscosity at 20° C.: 135 mPas) 103 g of the filler Millicarb® OG (calcium carbonate: product of Omya) were added and the mixture was homogeneously mixed. The two mixtures were combined. The thus produced reaction mixture had a filler content of 57.1% by weight and was applied atop 2 carrier films made of polyethylene. Reinforcing fibers (27 mm chopped glass made of Vetrotex EC 2400/P207) were broadcast onto one of the coated films. Both carrier films were placed together to form a sandwich comprising an inner layer of PUR reaction mixture between two carrier films. A reinforcing fiber content of the inner polyurethane layer of 30% by weight was targeted. Due to the high reactivity and the very rapid viscosity increase, rolling of the sandwich to achieve a good distribution of the fibers was no longer possible. Production of an SMC and thus of a fiber composite component part was not possible.

To determine the gel time of the reaction mixture and the viscosity time profile at 23° C. the reaction mixture was stirred for 10 seconds in a paper cup without previous degassing of the starting components until the mixture was in a homogeneous state. To determine gel time and viscosity the mixture was transferred into the gel timer and the rheometer respectively.

Comparative Example 3

Data from U.S. Pat. No. 5,236,976 A, example 7

Comparative Example 4

33 g of a polyester polyol having an OH number of 110 mg KOH/g, having 95% based on all OH groups of secondary OH groups and having a number-average functionality of 2 (viscosity at 25° C.: 11500 mPas; product of adipic acid and 2,3-butanediol, experimental product of Covestro Deutschland AG), 0.3 g of Edenor® TI 05 (additive: dist. oleic acid; product of Cognis GmbH) and 1.0 g of Toyocat® DB40 (thermolatent catalyst: blocked amine from TOSOH Corporation) were homogeneously mixed. Subsequently, 29.9 g of the filler Millicarb® OG (calcium carbonate: product of Omya) were added and the mixture was mixed. Simultaneously, to 55.4 g of Desmodur® 44P01 (polyisocyanate from Covestro Deutschland AG; f=2.68; NCO content: 29.15% by weight; viscosity at 20° C.: 135 mPas) 89.7 g of the filler Millicarb® OG (calcium carbonate: product of Omya) were added and the mixture was mixed. The two mixtures were combined. The thus produced reaction mixture had a filler content of 57.1% by weight and was applied atop 2 carrier films made of polyethylene. Reinforcing fibers (27 mm chopped glass made of Vetrotex® EC 2400/P207) were broadcast onto one of the coated films. Both carrier films were placed together to form a sandwich comprising an inner layer of PUR reaction mixture between two carrier films. A reinforcing fiber content of the inner polyurethane layer of 30% by weight was targeted. Due to the high viscosity and the very rapid viscosity increase, rolling of the sandwich to achieve a good distribution of the fibers was no longer possible. Production of an SMC and thus of a fiber composite component part was likewise not possible.

To determine the gel time of the reaction mixture and the viscosity time profile at 23° C. the reaction mixture was stirred for 10 seconds in a paper cup without previous degassing of the starting components until the mixture was in a homogeneous state. To determine gel time and viscosity the mixture was transferred into the gel timer and the rheometer respectively.

TABLE 1

| | Examples | | | |
| --- | --- | --- | --- | --- |
| | Example 1 | Comparative example 2 | Comparative example 3* | Comparative example 4 |
| NCO/OH equivalents ratio | 5.38:1 | 4.1:1 | — | 5.38:1 |
| Calculated residual NCO content of the reaction mixture directly after production | 14.7% | 14.7% | — | 14.7% |
| $t_g$ at 23° C. [min] | 117 | 11 | — | — |
| Viscosity at 23° C. (directly after mixing) [mPas]; measured according to DIN EN ISO 53019 (d/dt = 1 1/s) | 6940 | 9300 | — | 254000 |
| Viscosity at 23° C. (15 min. after mixing) [mPas]; measured according to DIN EN ISO 53019 (d/dt = 1 1/s) | 11100 | 51400 | — | 500000 |

TABLE 1-continued

| | Examples | | | |
|---|---|---|---|---|
| | Example 1 | Comparative example 2 | Comparative example 3* | Comparative example 4 |
| NCO value of the SMC [after days]; measured according to DIN EN ISO 14896: 2009-07 - Process A [% by weight] Tensile test according to EN ISO 527-1: 2012 | after 7 days: 10.7 after 14 days: 10.6 after 21 days: 10.0 after 28 days: 9.8 | — | — | — |
| Tensile modulus [MPa] | 13601 | — | 13100 | — |
| Tensile strength at F max. [MPa] | 142 | — | 85 | — |
| HDT A (ISO 75 - 1/75 2004) flat ended [° C.] | 219 | — | — | — |
| Density according to DIN EN ISO 1183-1 [kg/m$^3$] | 1900 | — | — | — |
| VOC value (toluene equivalent) according to VDA 278 [mg/kg] | 73 | — | — | — |

*Data from U.S. Pat. No. 5,236,976 A, example 7

The storage stability of the SMC from example 1 was determined with reference to the NCO value [in % by weight]. It is apparent from the values in table 1 that the crosslinking ability of the SMC was not impaired by storage at room temperature over a period of 4 weeks. Only inventive SMC made of selected polyurethane reaction mixtures can be further processed into component parts as is shown by the comparative examples.

In comparative example 2 a polyether polyol comprising approximately 95% primary OH end groups was used instead of the polyether polyol from example 1. The molar amount of latent catalyst Toyocat® DB 40 remained unchanged. Within just a few minutes at room temperature the resulting reaction mixture underwent almost complete reaction so that production of neither an SMC nor a fiber composite component part was possible.

In comparative example 4 a polyester polyol having an OH number of 110 mg KOH/g and a functionality of 2 was employed instead of the polyether polyol from example 1. The remaining components remained unchanged. Due to the high viscosity and the rapid viscosity increase neither rolling nor distribution of the fibers was possible.

The invention claimed is:

1. A process for producing a polyurethane-based fiber composite component part comprising the following process steps:
   a) producing a polyurethane reaction mixture;
   b) applying the reaction mixture atop at least one of two carrier films;
   c) bestowing the reaction mixture on the at least one of the two carrier films with reinforcing fibers;
   d) bringing together the two carrier films from c) so that the carrier films on both sides surround the reaction mixture comprising the reinforcing fibers and a sandwich is formed;
   e) rolling the sandwich via at least one of rolls and rollers;
   g) converting the product from step e) to a desired size and removing the two carrier films;
   i) molding and completely curing the product from step g) in a mold to afford the fiber composite component part,
wherein the employed polyurethane reaction mixture consists of the following components:
   A) one or more aromatic isocyanate components;
   B1) 70% to 100% by weight of one or more polyol components selected from the group consisting of polyether polyols, polyester polyols and polycarbonate polyols having 70% to 100% secondary OH groups based on all of the OH groups in the respective molecule of the polyol components and having a number average OH number of 15 to 500 mg KOH/g and a number-average functionality of 1.9 to 2.5;
   B2) 0% to 30% by weight of one or more polyols selected from the group consisting of polyether polyols, polyester polyols and polycarbonate polyols having a number average OH number of 15 to 500 mg KOH/g and a number-average functionality of 1.9 to 2.5 excluding the polyol component B1);
wherein B1) and B2) sum to 100% by weight and at least 70% of the entirety of the OH groups of components B1) and B2) are secondary OH groups;
   C) optionally one or more short-chain polyols having a number average OH number of 550 to 2000 mg KOH/g and a number average functionality of 1.9 to 6;
   D) one or more internal release agents;
   E) one or more thermolatent catalysts catalytically active at temperatures of 50° C. to 120° C.;
   F) inorganic fillers; and
   G) optionally auxiliary and/or additive substances;
wherein at 23° C. the polyurethane reaction mixture has a starting viscosity of 2500 to 14000 mPas and the ratio of the number of NCO groups of component A) to the number of OH groups of
components B1), B2) and C) is from 1.35:1 to 10:1.

2. The process of claim 1, wherein step e) further comprises at least one of:
   subsequent rolling up of the sandwich to afford a sheet molding compound (SMC); and
   subsequent cutting of the sandwich into SMC pieces and stacking of the SMC pieces.

3. The process of claim 2, further comprising storing the rolled-up SMC or the SMC stack.

4. The process of claim 1, further comprising stacking a plurality of products from step g).

5. The process of claim 1, wherein the one or more thermolatent catalysts of component E) are catalytically active at temperatures of 60° C. to 100° C.

* * * * *